(12) United States Patent
Mahatme et al.

(10) Patent No.: US 11,164,648 B2
(45) Date of Patent: Nov. 2, 2021

(54) GLITCH PROFILING IN AN INTEGRATED CIRCUIT

(71) Applicant: NXP USA, Inc., Austin, TX (US)

(72) Inventors: Nihaar N. Mahatme, Austin, TX (US);
Srikanth Jagannathan, Austin, TX (US)

(73) Assignee: NXP USA, Inc., Austin, TX (US)

(*) Notice: Subject to any disclaimer, the term of this patent is extended or adjusted under 35 U.S.C. 154(b) by 259 days.

(21) Appl. No.: 16/444,739

(22) Filed: Jun. 18, 2019

(65) Prior Publication Data

US 2020/0402602 A1 Dec. 24, 2020

(51) Int. Cl.
*G11C 29/02* (2006.01)
*G01R 31/3193* (2006.01)
*G11C 7/10* (2006.01)

(52) U.S. Cl.
CPC ........ *G11C 29/02* (2013.01); *G01R 31/31937* (2013.01); *G11C 7/1063* (2013.01)

(58) Field of Classification Search
CPC .............. G01R 31/31937; G11C 29/02; G11C 7/1063
See application file for complete search history.

(56) References Cited

U.S. PATENT DOCUMENTS

| | | |
|---|---|---|
| 5,210,538 A | 5/1993 | Kuroiwa |
| 6,377,065 B1 | 4/2002 | Le et al. |
| 7,283,920 B2 * | 10/2007 | Doi .................. G01R 31/31937 702/125 |
| 7,483,328 B2 | 1/2009 | Kim et al. |
| 8,848,477 B2 | 9/2014 | Schrijen et al. |
| 9,141,809 B2 | 9/2015 | McLean |
| 9,523,722 B2 | 12/2016 | Tasker et al. |
| 9,947,391 B1 | 4/2018 | Mahatme et al. |

OTHER PUBLICATIONS

Claes et al.: "Comparison of SRAM and FF PUF in 65nm technology", Information Security Technology for Applications (Peeter Laud, ed), Lecture Notes in Computer Science, vol. 7161, Springer Berlin / Heidelberg, 2012, pp. 47-64.
Colin O'Flynn, "Fault Injection using Crowbars on Embedded Systems", https://eprint.iacr.org/2016/810.pdf, pp. 1-12.

(Continued)

*Primary Examiner* — Minh Q Phan

(57) ABSTRACT

A circuit includes a glitch measurement circuit and a glitch profile circuit. The glitch measurement circuit includes a first comparator to compare a glitch in a power supply voltage to a first threshold voltage, a first counter to generate a first count indicative of a time duration the first comparator indicates that the glitch trips the first threshold voltage, a second comparator to compare the glitch in the power supply voltage to a second threshold voltage different than the first threshold voltage, and a second counter to generate a second count indicative of a time duration the second comparator indicates that the glitch trips the second threshold voltage. The glitch profile circuitry utilizes the first count and the second count to generate a multi-voltage profile of the glitch, wherein the multi-voltage profile includes indications of the time durations indicated by the first count and the second count.

20 Claims, 4 Drawing Sheets

(56) References Cited

OTHER PUBLICATIONS

Riscure, "Inspector Fault Injection", https://www.riscure.com/security-tools/inspector-fi/, pp. 1-15.

Schrijen et al.: "Comparative analysis of SRAM memories used as PUF primitives", 2012 Design, Automation & Test in Europe Conference & Exhibition (DATE), Mar. 12-16, 2012, Dresden, Germany, pp. 1-6.

Selimis et al.: "Evaluation of 90nm 6T-SRAM as Physical Unclonable Function for Secure Key Generation in Wireless Sensor Nodes", 2011 IEEE International Symposium of Circuits and Systems (ISCAS), May 15-18, 2011, Rio de Janeiro, Brazil, pp. 1-4.

Suh et al.: "Physical Unclonable Functions for Device Authentication and Secret Key Generation", 2007 44th ACM/IEEE Design Automation Conference, Jun. 4-8, 2007, San Diego, CA, USA, pp. 1-6.

Timmers et al.: "Escalating Privileges in Linux using Voltage Fault Injection", 2017 Workshop on Fault Diagnosis and Tolerance in Cryptography, 978-1-5386-2948-2 /17, 2017 IEEE, DOI 10.1109/FDTC.2017.16, pp. 1-8.

\* cited by examiner

GLITCH PROFILING IN AN INTEGRATED CIRCUIT

BACKGROUND

Field

This disclosure relates generally to integrated circuits, and more specifically, to glitch profiling on power supply terminals of an integrated circuit.

Related Art

Glitch attacks are commonly used by hackers to disrupt operation of an integrated circuit (IC) in order to force the IC into an unsecure mode of operation. These glitches can be caused by, for example, physical attacks on the power supply terminals or via electromagnetic attacks to disturb the power grid of an IC. Once in an unsecure mode of operation, functions and services of the IC can possibly be accessed without proper authorization. For example, glitch attacks can cause a central processing unit (CPU) of an IC to skip instructions or fail instruction execution during boot mode, which can disrupt the boot process and place the IC into the unsecure mode. Once in the unsecure mode, unauthorized access to the IC may be obtained via debug or test ports, or the IC may be able to run unsecure or malicious software.

As the information required to force an IC into an unsecure mode is initially unknown, glitch attacks generally begin by trial and error through introducing multiple power supply voltage spikes of different amplitudes, pulse-widths, and start times. Glitch attacks can also be introduced into the clock signals of an IC, but these are usually done in conjunction with glitch attacks on the power supplies. Glitch attacks on the power supplies introduce intentional glitches into the power supply terminal. However, within an IC, glitches on the power supplies can also occur unintentionally, which do not present the security risks of glitch attacks. Since glitch attacks present a major security vulnerability, a need exists to detect these glitch attacks and to differentiate such attacks from normal, unintentional glitches in the power supply terminals.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In order to detect glitch attacks, which present security vulnerability, analog glitch measurement circuits are coupled to each power supply pin of an IC to provide profile information at multiple voltage levels for each detected glitch. For example, this profile information includes the widths of the glitch at various voltage levels. Glitch profile aggregator circuits aggregate the profile information on detected glitches. This aggregated profile information, along with timestamps for the glitches, is processed to determine whether a glitch attack is likely present.

Figure 1:
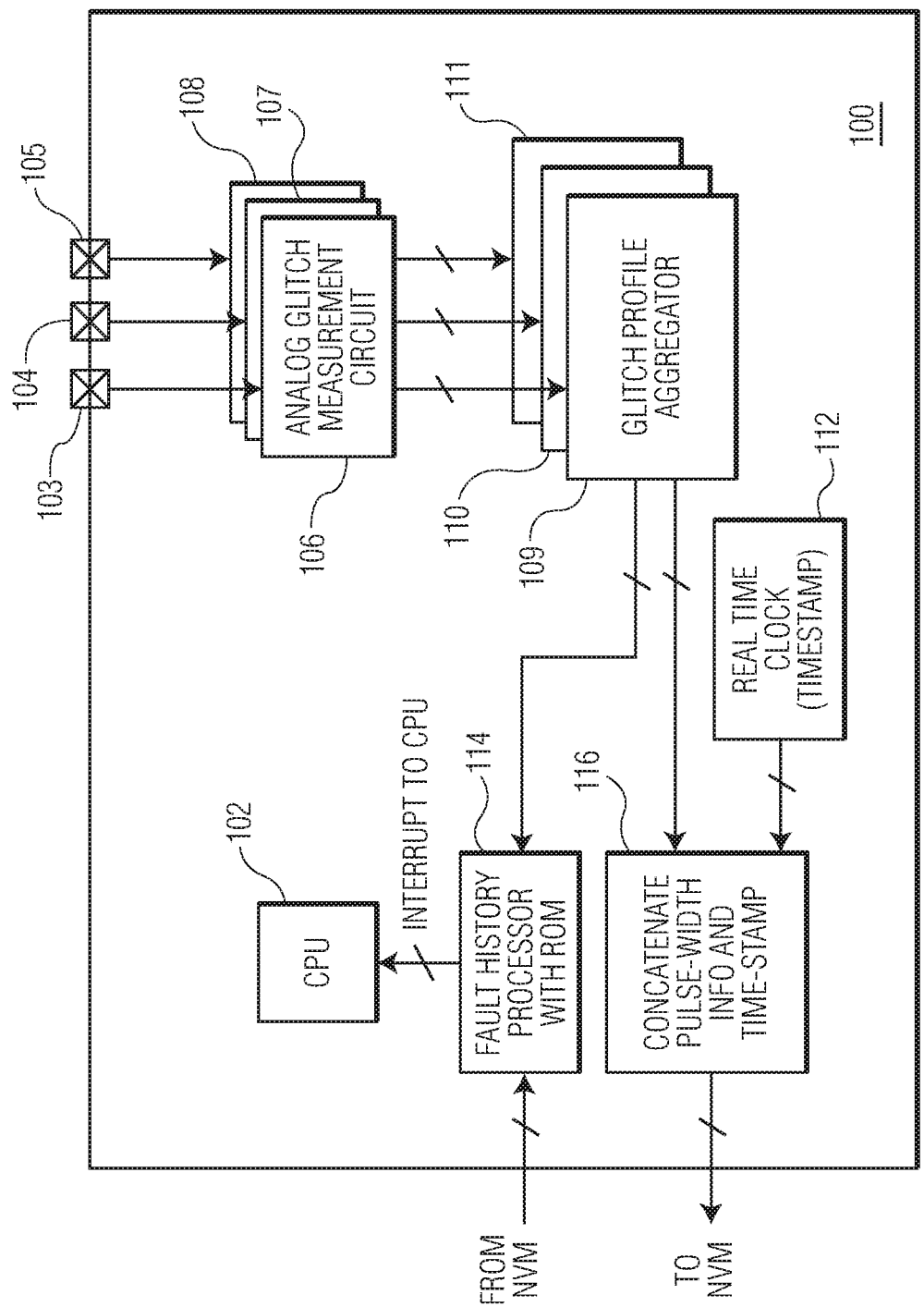
FIG. 1 illustrates, in block diagram form, an integrated circuit (IC) having voltage supply pins and corresponding analog glitch measurement circuits, in accordance with one embodiment of the present invention.

FIG. 1 illustrates, in block diagram form, an integrated circuit (IC) 100 having a CPU 102, a fault history processor 114 which may include a read-only-memory (ROM), a plurality of power supply voltage input terminals 103-105 (also referred to as power supply pins), a plurality of analog glitch measurement circuits 106-108, a plurality of glitch profile aggregator circuits 109-111, a real time clock 112, and a concatenate circuit 116. A corresponding analog glitch measurement circuit of circuits 106-108 is coupled to a corresponding input terminal 103-105, respectively, and a corresponding glitch profile aggregator circuit of circuits 109-110 is coupled to a corresponding analog glitch measurement circuit 106-108, respectively. Concatenate circuit 116 is coupled to receive information from the glitch profile aggregator circuits 109-111 and real time clock 112, and can communicate glitch profile information with corresponding time stamps to a memory, such as a non-volatile memory (NVM) which may reside on or off chip. Fault history processor 114 can also receive profile information from the glitch profile aggregator circuits 109-111 and stored information from the NVM and generate signals, such as interrupts, to CPU 102. This allows CPU 102 to properly respond to glitch attack threats.

In operation, and as will be described in more detail below, each analog glitch measurement circuit obtains profile information, such as pulse widths at multiple voltage levels, for each detected glitch on its corresponding input terminal, in which a glitch refers to a temporary drop or rise in voltage at the corresponding input terminal. For the examples described herein, it is assumed that a glitch refers to a temporary drop in voltage. The glitch profile aggregator circuit receives and stores the profile information taken at the multiple voltage levels for a glitch. For example, each glitch on a corresponding input terminal may have multiple pulse width measurements taken at multiple voltage levels. This information allows for the reconstruction of a glitch, if desired. Furthermore, concatenate circuit 116 applies a time stamp to each of the glitch pulse width measurements aggregated by the glitch profile aggregator circuits. This information is stored in the NVM, and using the information stored in the NVM, fault history processor 114 can determine if there is a glitch attack, as opposed to a normal glitch which does not amount to a glitch attack.

Figure 2:
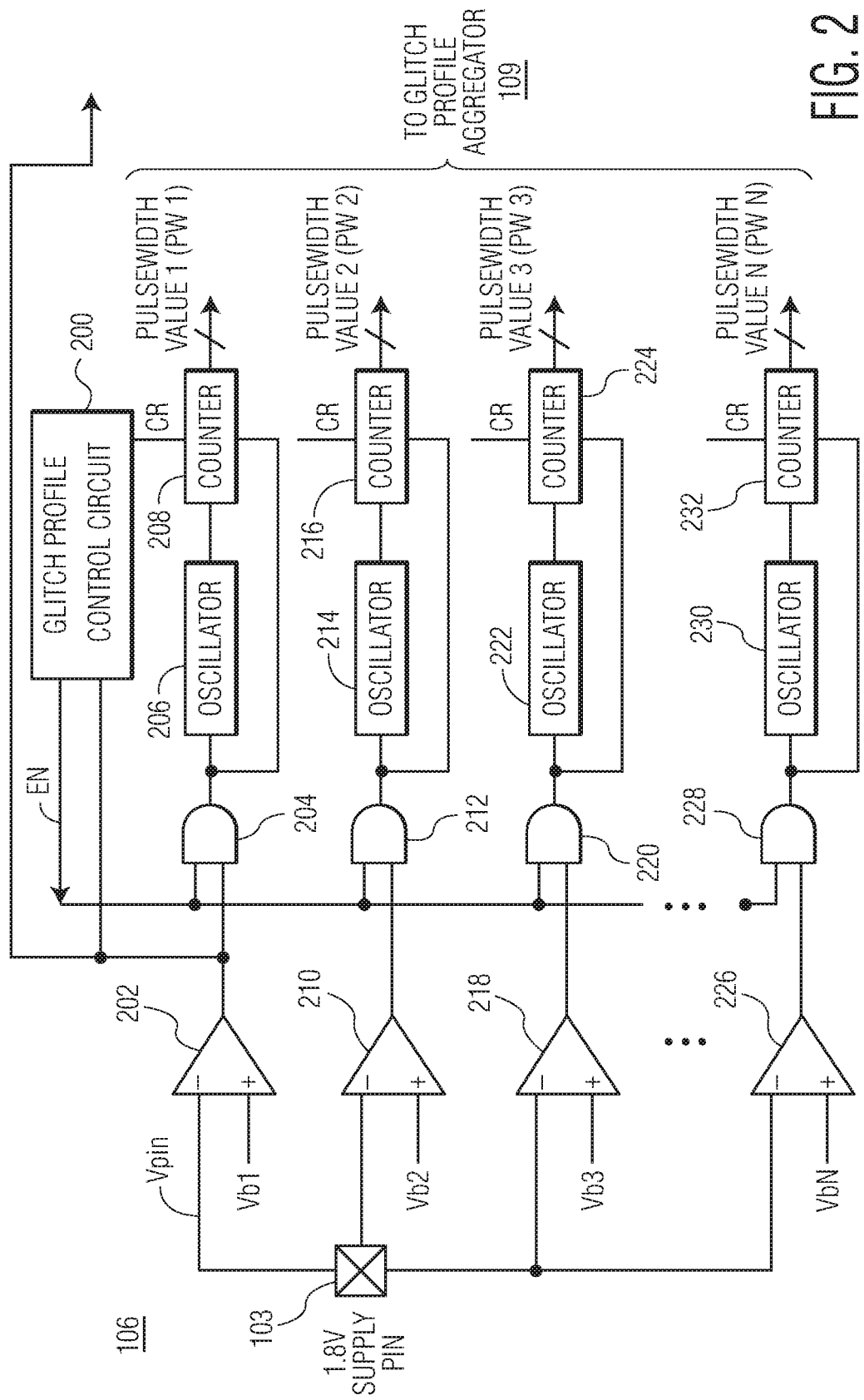
FIG. 2 illustrates, in partial schematic and partial block diagram form, an analog glitch measurement circuit and power supply pin of the IC of FIG. 1, in accordance with one embodiment of the present invention.

FIG. 2 illustrates, in partial schematic and partial block diagram form, analog glitch measurement circuit 106, which is coupled to power supply pin 103. The voltage on pin 103 is referred to as Vpin. Glitch measurement circuit 106 includes N comparators, including comparators 202, 210, and 218, N AND gates, including AND gates 204, 212, 220, and 228, N oscillators, including oscillators 206, 214, 222, and 230, N counters, including counters 208, 216, 224, and 232, and a glitch profile control circuit 200. Each of the N comparators has a first input (e.g. an inverting input) coupled to receive Vpin and a second input (e.g. a non-inverting input) coupled to a corresponding threshold voltage, Vb1-VbN, respectively. In the current embodiment, in which glitches refer to temporary drops in the power supply, Vb1-VbN are set to sequentially decreasing values. Each of the N AND gates 204, 212, 220, . . . , 228 has a first input coupled to receive an enable signal, EN, from glitch profile control circuit 200 and a second input coupled to receive an output of the corresponding comparator, 202, 210, 218, ..., 226, respectively. Each of the N oscillators, 206, 214, 222, ..., 230, is coupled to an output of a corresponding AND gate, 204, 212, 220, ..., 228, respectively, at an enable input of the oscillator. Note that when an enable input of an oscillator is asserted, the oscillator outputs a clock signal. Each oscillator may be implemented as, for example, a ring oscillator.

Continuing with FIG. 2, counter 208 receives a counter reset signal, CR, from glitch profile control circuit 200 at a reset input, an output from oscillator 206 at a clock input, and the output of AND gate 204 at a counter enable input, and provides a pulse width value 1 (PW1) at an output. PW1 corresponds to the count value of counter 208. Each of the N counters of FIG. 2 is coupled in a similar manner. For example, counter 216 receives CR from glitch profile control circuit 200 at a reset input, an output from oscillator 214 at a clock input, and the output of AND gate 212 at a counter enable input, and provides a pulse width value 2 (PW2) at an output. PW2 corresponds to the count value of counter 216. Counter 224 receives CR from glitch profile control circuit 200 at a reset input, an output from oscillator 222 at a clock input, and the output of AND gate 220 at a counter enable input, and provides a pulse width value 3 (PW3) at an output. PW3 corresponds to the count value of counter 224. Counter 232 receives CR from glitch profile control circuit 200 at a reset input, an output from oscillator 230 at a clock input, and the output of AND gate 228 at a counter enable input, and provides a pulse width value N (PWN) at an output. PWN corresponds to the count value of counter 232. The pulse width (PW) values PW1-PWN are provided to glitch profile aggregator circuit 109 for storage. Therefore, in one embodiment, each glitch profile aggregator circuit includes storage circuitry. Flip-flops or memory circuits such as Static Random Access Memories (SRAMs) can be used for storage.

Note that when the reset input of a counter is asserted, such as with a pulse, the count value of the counter is reset (e.g. to zero). When the count enable input is asserted, the counter counts rising edges of the clock signal received at the clock input (which is provided by a corresponding oscillator). Alternatively, the counter may count falling edges rather than rising edges.

In operation, each counter generates a count value indicative of a time duration that the corresponding comparator indicates the voltage supply on pin 103 is at or below a corresponding threshold voltage during occurrence of a glitch on pin 103. For example, PW1 indicates the time duration that the voltage supply on pin 103 is at or below Vb1, PW2 indicates the time duration that the voltage supply on pin 103 is at or below Vb2, PW3 indicates the time duration that the voltage supply on pin 103 is at or below Vb3, and PWN indicates the time duration that the voltage supply on pin 103 is at or below VbN. As will be described in reference to FIG. 3 below, each PW value corresponds to the pulse width of a pulse generated by a corresponding comparator based a corresponding threshold voltage.

Figure 3:
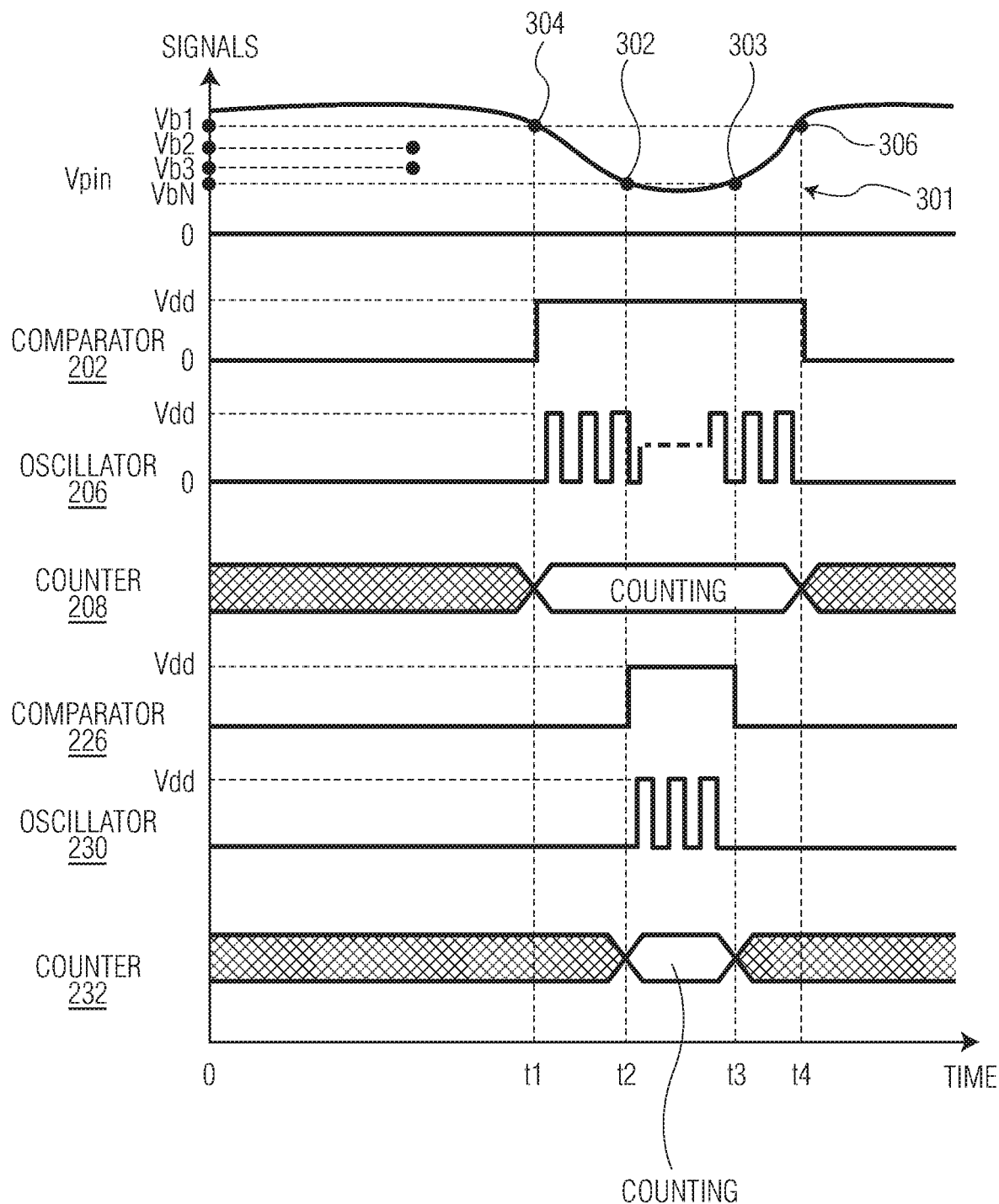
FIG. 3 illustrates, in timing diagram form, various signals in the analog glitch measurement circuit of FIG. 2, in accordance with one embodiment of the present invention.

FIG. 3 illustrates a timing diagram of various signals in analog glitch measurement circuit 106, detailing specifically the generation of PW1 at counter 208 and PWN at counter 232 during a glitch 301 on pin 103 in which glitch 301 is a temporary drop in the power supply voltage, Vpin, on pin 103. Comparator 202 generates a pulse based on consecutive crossings of glitch 301 and Vb1, and counter 208 provides the pulse width of that pulse as PW1. Comparator 226 generates a pulse based on consecutive crossings of glitch 301 and VbN, and counter 232 provides the pulse width of that pulse as PWN. Although not illustrated in FIG. 3, each comparator of analog measurement circuit 106 generates a pulse based on consecutive crossings of glitch 301 and the corresponding threshold voltage, and the corresponding counter provides the corresponding PW value.

Referring to time t0 of FIG. 3, Vpin starts off above Vb1, in which no glitch is occurring. At time t0, the output of comparators 202 and 226 are low (e.g. zero), and oscillators 206 and 230 are not enabled and therefore also at 0. The outputs of counters 208 and 232 are don't cares or indeterminate at this time, as indicated by the hash marks. Although not included in the timing diagram, EN provided by glitch profile control circuit 200 is asserted to a logic level 1. In this manner, the outputs of the N AND gates is dependent upon the outputs of the corresponding comparators. Also, each of the N counters have been properly reset to zero.

At time t1, Vpin crosses the first voltage threshold, Vb1, as indicated at point 304 of FIG. 3. When Vpin drops below Vb1, the output of comparator 202 goes high (e.g. to VDD) which enables oscillator 206, via AND gate 204, to generate a clock signal, as illustrated by a square wave in FIG. 3. Also at time t1, with the assertion of the output of comparator 202, counter 208 is enabled, via AND gate 204, to begin counting rising edges of the clock signal generated by oscillator 206 (and provided to the clock input of counter 208). Therefore, starting at time t1, counter 208 is counting. Continuing with the example of comparator 202, oscillator 206, and counter 208, at time t4, Vpin again crosses Vb1, indicated at point 306 in FIG. 3. When Vpin goes above Vb1, the output of comparator 202 again goes low, disabling oscillator 206 and stopping counter 208 from counting. The count value at time t4 is provided as PW1 which indicates a time duration that comparator 202 indicates that glitch 301 on Vpin 103 trips Vb1. That is, PW1 indicates the time duration of the pulse generated by comparator 202 between consecutive crossings of glitch 103 and Vb1 (at points 304 and 306), corresponding to t4-t1 or the period of time that Vpin is at or below Vb1.

Referring now to PWN, at time t2, Vpin continues falling and crosses the Nth voltage threshold, VbN, as indicated at point 302 of FIG. 3. When Vpin drops below VbN, the output of comparator 226 goes high, which enables oscillator 230, via AND gate 228, to generate a clock signal. Also at time t2, counter 232 is enabled to begin counting rising edges of the clock signal generated by oscillator 230 and provided to the clock input of counter 232. Therefore, starting at time t2 (which is later than time t1), counter 232 is counting. At time t3, Vpin again crosses VbN, indicated at point 303 in FIG. 3. When Vpin goes above VbN, the output of comparator 226 again goes low, disabling oscillator 230 and stopping counter 232 from counting. The count value at time t3 is provided as PWN which indicates a time duration that comparator 226 indicates that glitch 301 on Vpin trips VbN. That is, PWN indicates the time duration of the pulse generated by comparator 226 between consecutive crossings of glitch 103 and VbN (at points 302 and 303), corresponding to t3-t2 or the period of time that Vpin is at or below VbN.

Note that since Vb1-VbN are set to sequentially decreasing values, between times t1 and t4, glitch 103 on Vpin also consecutively crosses each of voltage thresholds Vb2 and Vb3, in which generation of PW2 and PW3, respectively, occurs analogous to the descriptions above with respect to PW1 and PWN. Therefore, PW1-PWN provide a multi-voltage profile of glitch 301, corresponding to Vb1-VbN, respectively, in which each PW value provides a width of glitch 301 at a different voltage level. These are all provided to glitch profile circuit 116 for storage. With the stored information, a glitch, such as glitch 103 of FIG. 3, can be reconstructed. That is, analog glitch measurement circuits provide more than a mere indication of the occurrence of a glitch, but provide profile information including time durations (e.g. pulse widths) at various voltage points of each single glitch.

After the count value, e.g. PW1, corresponding to the first threshold voltage, e.g. Vb1, is provided to aggregator circuit 109, glitch profile control circuit 200 can assert CR to reset all the counters. For example, the output of comparator 202 can be provided to glitch profile control circuit 200 so that upon a falling edge of the output, it is known that the glitch no longer trips at the first threshold and thus all the counters can be reset via CR. Since Vb1 is the first (and thus largest) threshold, a falling edge at the output of comparator 202 also indicates that the glitch is done. Therefore, the output of comparator 202 can also be provided to glitch profile aggregator circuit 109 to indicate to circuit 109 when the glitch is done.

The polarity and configuration of the elements of FIG. 2 can be changed and still achieve the desired glitch profiling. For example, if a glitch instead refers to a temporary rise in supply voltage, the N comparators can be used to detect when a glitch trips corresponding voltage thresholds by first rising above the thresholds vs first falling below the thresholds, as in FIG. 3. In this case, Vb1-VbN can be set to sequentially increasing values instead. Therefore, in the case of a glitch referring to a temporary fall in supply voltage, the glitch trips a threshold voltage during the time it is at or below the threshold voltage, and in the case of a glitch referring to a temporary rise in supply voltage, the glitch trips the threshold voltage during the time it is at or above the threshold voltage. Also, the inverting and non-inverting inputs of the comparators may be swapped and still achieve the profiling of a single glitch at multiple voltage points. For example, a negative pulse rather than a positive pulse may be provided by each of comparators and used to provide the PW values. Alternatively, other methods and circuits may be used to determine the duration of time between consecutive crossings of a glitch and a particular threshold voltage.

In yet another embodiment, each of the N oscillators may run continuously, with the output of the corresponding AND gate controlling the corresponding counter to only count when the output of the corresponding comparator is asserted. In yet another embodiment, a single oscillator may be used and shared by all of the N counters. In this embodiment, the single oscillator would provide a clock signal to all the clock inputs of the N counters and each counter would be controlled to enable and disable counting by the output of the corresponding comparator (via the corresponding AND gate). This single oscillator can also be shared among a plurality or all of the analog glitch measurement circuits of IC 100. Note that each of the oscillators, whether multiple or shared, generate a clock signal having a frequency that is high enough to provide enough pulse width distinctions at the various voltage thresholds for a glitch. Also, the frequency has to be such that a measurement can be made at the voltage threshold which would correspond to the smallest duration or pulse width, e.g. at VbN in the example of FIG. 3.

Referring back to FIG. 1, each glitch profile aggregator circuit receives and stores the multi-voltage glitch profiles for each glitch on its corresponding voltage pin. The profile information for a glitch includes the duration (PW values) at various threshold voltages. Concatenate circuit 116 correlates a time stamp with each PW value from the glitch profile aggregator circuits and provides the PW values and corresponding time stamps to the NVM for storage. (Note that all the glitch profile aggregator circuits, along with concatenate circuit 116, may be referred to as the glitch profile aggregator circuit.) From the multi-voltage glitch profiles and time stamp information stored in the NVM, fault history processor 114 can determine not only occurrence of a glitch and the number of glitches within a particular time window, but can also determine the widths of the glitch at various voltage thresholds. Using this information, fault history processor 114 can determine if a glitch attack on the power supply voltage is present or if a normal glitch on the power supply voltage is indicated which does not signify a glitch attack. Fault history processor 114 can alert CPU 102 in response to detection of a glitch attack, such as via an interrupt.

The profile information and time stamps are stored in NVM so that the history is not lost upon loss of power. In one embodiment, whenever a new entry is made to the NVM, fault history processor 114 reads the last X values of glitch profile information to process. In one embodiment, if the number of allowable entries in the NVM exceeds a predetermined threshold, a malicious attack may be indicated and an interrupt can be sent to CPU 102. In response to such an interrupt, CPU 10 may enter safe mode which disables peripherals and debug port access.

Figure 4:
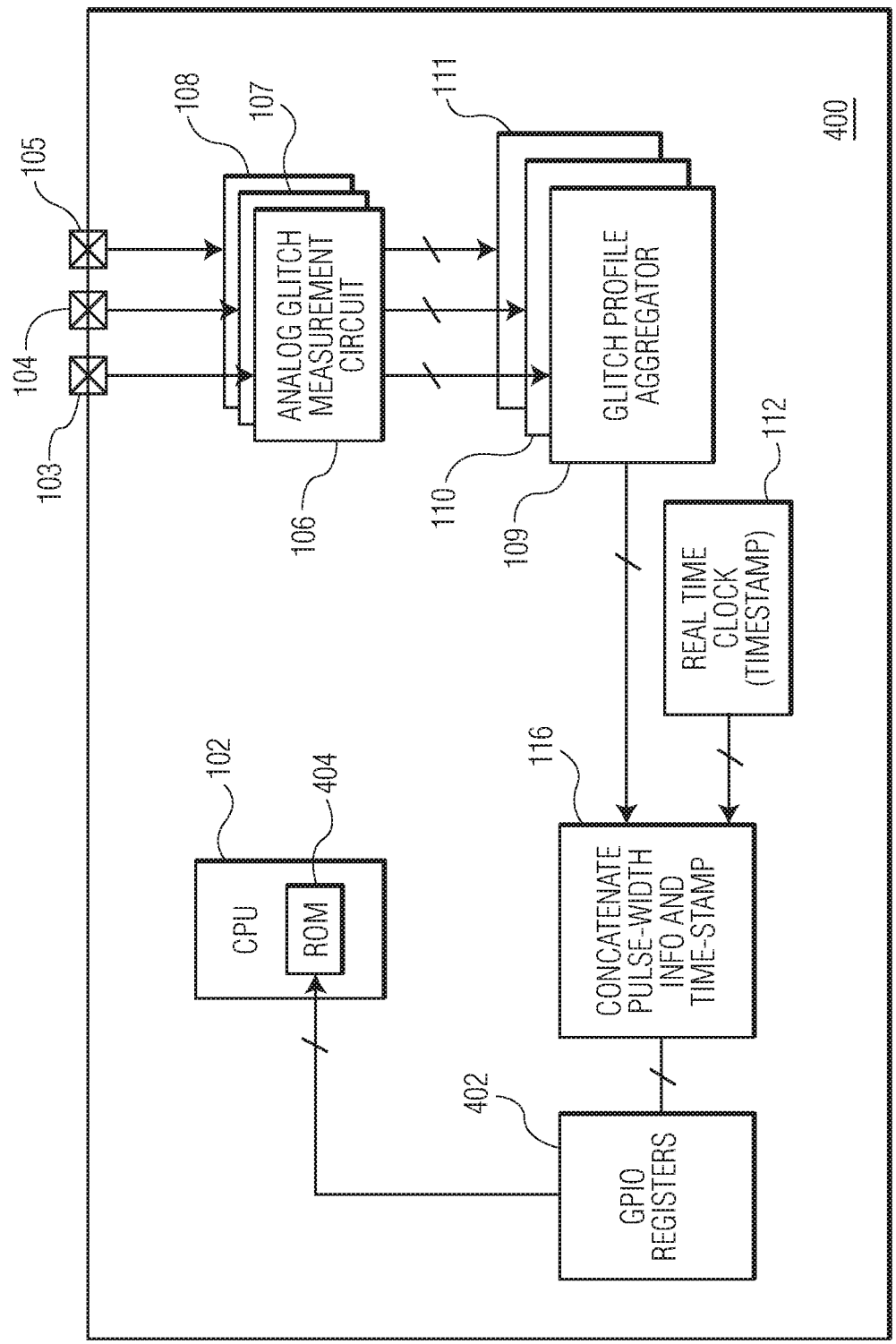
FIG. 4 illustrates, in block diagram form, IC having voltage supply pins and corresponding analog glitch measurement circuits, in accordance with one embodiment of the present invention.

FIG. 4 illustrates, in block diagram form, an IC 400 in accordance to an alternate embodiment of the present invention, in which like numerals with FIG. 1 indicate like elements. In IC 400, rather than storing the PW information and corresponding time stamps in an NVM (on or off chip), general purpose input/output (GPIO) registers may be used instead. In this embodiment, for more are efficient implementation, Read Only Memory (ROM) 404 within CPU 102 can directly read GPIO registers 402 during the boot process. In this embodiment, X registers are allocated for the number of glitches that need to be monitored. If the number of entries with non-zero values exceeds a threshold in a fixed interval of time or during program execution, then the ROM code branches to a function to take appropriate action against malicious glitch attacks. In this case, CPU 102 may enter safe mode which disables peripherals and debug port access.

Therefore, by now it can be understood how an analog glitch measurement circuit coupled to an IC power supply pin can be used to generate multi-voltage profiles for each glitch detected on the power supply pin. For each detected glitch, the multi-voltage profiles are stored, along with corresponding time stamps, such that a determination can be made whether a glitch attack on the power supply pin is occurring. This determination may be based on the timing relationship between the occurrences of glitches. In one aspect, this determination includes determining that a number of glitches meet a particular profile criteria (e.g. in accordance with multiple voltage thresholds) within a predetermined amount of time.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, a glitch may refer to an increase in supply voltage on an IC pin, and therefore, the polarities of the circuitry may be reversed and the threshold voltages (Vb1-VbN) in the analog glitch measurement circuits may be set in increasing rather than decreasing order. However, even in this case, the analog glitch measurement circuits are capable of profiling each glitch at multiple voltage thresholds. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

a circuit includes an input to receive a power supply voltage; a glitch measurement circuit, coupled to the input, in which the glitch measurement circuit includes a first comparator to compare a glitch in the power supply voltage received at the input to a first threshold voltage, a first counter to generate a first count indicative of a time duration the first comparator indicates that the glitch trips the first threshold voltage, a second comparator to compare the glitch in the power supply voltage received at the input to a second threshold voltage, the second threshold voltage being different than the first threshold voltage, a second counter to generate a second count indicative of a time duration the second comparator indicates that the glitch trips the second threshold voltage; and a glitch profile circuitry utilizing the first count and the second count to generate a multi-voltage profile of the glitch, wherein the multi-voltage profile includes indications of the time durations indicated by the first count and the second count. In one aspect of this embodiment, the circuit further includes control circuitry, wherein the first threshold voltage is relative to the second threshold voltage such that a glitch in the supply voltage will trip the first threshold voltage prior to tripping the second threshold voltage, wherein the control circuitry resets the first count of the first counter and the second count of the second counter responsive to an indication by the first comparator that the glitch no longer trips the first threshold voltage. In another aspect, the circuit further includes control circuitry, wherein the first threshold voltage is relative to the second threshold voltage such that a glitch in the power supply voltage will trip the first threshold voltage prior to tripping the second threshold voltage, wherein the control circuitry provides an indication to the glitch profile circuitry that the glitch has ceased based on an indication by the first comparator that the glitch no longer trips the first threshold voltage. In yet another aspect, the circuit further includes processing circuitry wherein the processing circuitry uses multi-voltage profiles generated by the glitch profile circuitry of glitches in the power supply voltage at the input from counts generated by the first counter and the second counter to determine whether the circuit is being attacked by glitches in the power supply voltage. In another aspect, the circuit further includes a nonvolatile memory to store multi-voltage profiles generated by the glitch profile circuitry of glitches in the power supply voltage at the input from counts generated by the first counter and the second counter. In another aspect, the glitch is a drop in the power supply voltage at the input, wherein the first threshold voltage is a higher threshold voltage than the second threshold voltage. In yet another aspect, the glitch profile circuitry includes an input to receive a clock signal from a real time clock, wherein the glitch profile circuitry uses the clock signal to indicate a time of occurrence of the glitch in the multi-voltage profile. In another aspect, the circuit further includes a second input to receive a second power supply voltage; a second glitch measurement circuit, coupled to the second input, the second glitch measurement circuit including a third comparator to compare a glitch in the second power supply voltage received at the second input to a third threshold voltage, a third counter to generate a third count indicative of a time duration the third comparator indicates that the glitch in the second power supply voltage trips the third threshold voltage, a fourth comparator to compare the glitch in the second power supply voltage received at the second input to a fourth threshold voltage, the fourth threshold voltage being different than the third threshold voltage, a fourth counter to generate a fourth count indicative of a time duration the fourth comparator indicates that the glitch in the second power supply voltage trips the fourth threshold voltage; and wherein the glitch profile circuitry utilizes the third count and the fourth count to generate a multi-voltage profile of the glitch in the second power supply voltage, wherein the multi-voltage profile includes indications of the time durations indicated by the third count and the fourth count. In yet another aspect, the glitch measurement circuit further includes: a third comparator to compare the glitch in the power supply voltage received at the input to a third threshold voltage, the third threshold voltage being different than the first threshold voltage and the second threshold voltage, and a third counter to generate a third count indicative of a time duration the third comparator indicates that the glitch trips the third threshold voltage, and wherein the glitch profile circuitry utilizes the first count, the second count, and the third count to generate the multi-voltage profile of the glitch, wherein the multi-voltage profile includes indications of the time durations indicated by the first count, the second count, and the third count.

In another embodiment, a method includes receiving a power supply voltage at an input; generating a first count with a first counter, indicative of a time duration that a glitch in a power supply voltage received at the input trips a first threshold voltage; generating a second count, with a second counter, indicative of a time duration that the glitch trips a second threshold voltage, the second threshold voltage being a different than first threshold voltage; and generating, with glitch profile circuitry and utilizing the first count and the second count, a multi-voltage profile of the glitch, wherein the multi-voltage profile includes indications of the time durations indicated by the first count and the second count. In one aspect of the another embodiment, the first threshold voltage is relative to the second threshold voltage such that the glitch in the power supply voltage trips the first threshold voltage prior to tripping the second threshold voltage, and the method further includes resetting the first count of the first counter and the second count of the second counter responsive to an indication that the glitch no longer trips the first threshold voltage. In another aspect, the method further includes utilizing, by circuitry the multi-voltage profile to determine whether a circuit receiving the power supply voltage is being attacked by glitches in the power supply voltage. In another aspect, the method further includes generating a plurality of multi-voltage profiles for a plurality of glitches of the power supply voltage with the glitch profile circuitry, wherein the each of the plurality of multi-voltage profiles includes indications of the time durations indicated by counts of the first counter and counts of the second counter. In yet another aspect, the method further includes utilizing the plurality of multi-voltage profiles to determine whether a circuit receiving the power supply voltage is being attacked by glitches in the power supply voltage. In a further aspect, the utilizing the multi-voltage profiles to determine whether the circuit is being attacked includes determining a timing relationship between occurrences of the plurality of glitches, wherein the determination of an attack is based on the timing relationship of the occurrences. In yet a further aspect, the utilizing the multi-voltage profiles to determine whether a circuit is being attacked further includes determining whether a number of glitches of the plurality of glitches meeting at least one criteria occurs within a predetermined period of time. In another further aspect, the determining the timing relationship includes utilizing a clock signal form a real time clock to provide a time of occurrence of each glitch. In another aspect of the another embodiment, the method further includes generating a third count with a third counter, indicative of a time duration that the glitch trips a third threshold voltage, the third threshold voltage being different than the first threshold voltage and the second threshold voltage; wherein the generating the multi-voltage profile includes generating, with the glitch profile circuitry and utilizing the first count, the second count, and the third count, the multi-voltage profile of the glitch, wherein the multi-voltage profile includes indications of the time durations indicated by the first count, the second count, and the third count. In yet another aspect, the method further includes receiving a second power supply voltage at a second input; generating a third count with a third counter, indicative of a time duration that a second glitch in the second power supply voltage received at the second input trips a third threshold voltage; generating a fourth count with a fourth counter, indicative of a time duration that the second glitch trips a fourth threshold voltage, the fourth threshold voltage being different than third threshold voltage; and generating, with glitch profile circuitry and utilizing the third count and the fourth count, a second multi-voltage profile of the second glitch, wherein the second multi-voltage profile includes indications of the time durations indicated by the third count and the fourth count. In another aspect, the glitch is a drop in the power supply voltage at the input, wherein the first threshold voltage is a higher threshold voltage than the second threshold voltage.

What is claimed is:

1. A circuit comprising:
   an input to receive a power supply voltage;
   a glitch measurement circuit, coupled to the input, the glitch measurement circuit comprising:
   a first comparator to compare a glitch in the power supply voltage received at the input to a first threshold voltage,
   a first counter to generate a first count indicative of a time duration the first comparator indicates that the glitch trips the first threshold voltage,
   a second comparator to compare the glitch in the power supply voltage received at the input to a second threshold voltage, the second threshold voltage being different than the first threshold voltage,
   a second counter to generate a second count indicative of a time duration the second comparator indicates that the glitch trips the second threshold voltage; and
   a glitch profile circuitry utilizing the first count and the second count to generate a multi-voltage profile of the glitch, wherein the multi-voltage profile includes indications of the time durations indicated by the first count and the second count.

2. The circuit of claim 1, further comprising:
   control circuitry, wherein the first threshold voltage is relative to the second threshold voltage such that a glitch in the supply voltage will trip the first threshold voltage prior to tripping the second threshold voltage, wherein the control circuitry resets the first count of the first counter and the second count of the second counter responsive to an indication by the first comparator that the glitch no longer trips the first threshold voltage.

3. The circuit of claim 1, further comprising:
   control circuitry, wherein the first threshold voltage is relative to the second threshold voltage such that a glitch in the power supply voltage will trip the first threshold voltage prior to tripping the second threshold voltage, wherein the control circuitry provides an indication to the glitch profile circuitry that the glitch has ceased based on an indication by the first comparator that the glitch no longer trips the first threshold voltage.

4. The circuit of claim 1, further comprising processing circuitry wherein the processing circuitry uses multi-voltage profiles generated by the glitch profile circuitry of glitches in the power supply voltage at the input from counts generated by the first counter and the second counter to determine whether the circuit is being attacked by glitches in the power supply voltage.

5. The circuit of claim 1, further comprising a nonvolatile memory to store multi-voltage profiles generated by the glitch profile circuitry of glitches in the power supply voltage at the input from counts generated by the first counter and the second counter.

6. The circuit of claim 1 wherein in the glitch is a drop in the power supply voltage at the input, wherein the first threshold voltage is a higher threshold voltage than the second threshold voltage.

7. The circuit of claim 1 wherein the glitch profile circuitry includes an input to receive a clock signal from a real time clock, wherein the glitch profile circuitry uses the clock signal to indicate a time of occurrence of the glitch in the multi-voltage profile.

8. The circuit of claim 1 further comprising:
   a second input to receive a second power supply voltage;
   a second glitch measurement circuit, coupled to the second input, the second glitch measurement circuit comprising:
   a third comparator to compare a glitch in the second power supply voltage received at the second input to a third threshold voltage,
   a third counter to generate a third count indicative of a time duration the third comparator indicates that the glitch in the second power supply voltage trips the third threshold voltage,
   a fourth comparator to compare the glitch in the second power supply voltage received at the second input to a fourth threshold voltage, the fourth threshold voltage being different than the third threshold voltage,
   a fourth counter to generate a fourth count indicative of a time duration the fourth comparator indicates that the glitch in the second power supply voltage trips the fourth threshold voltage;
   wherein the glitch profile circuitry utilizes the third count and the fourth count to generate a multi-voltage profile of the glitch in the second power supply voltage, wherein the multi-voltage profile includes indications of the time durations indicated by the third count and the fourth count.

9. The circuit of claim 1 wherein:
   the glitch measurement circuit further comprises:
   a third comparator to compare the glitch in the power supply voltage received at the input to a third threshold voltage, the third threshold voltage being different than the first threshold voltage and the second threshold voltage, and
   a third counter to generate a third count indicative of a time duration the third comparator indicates that the glitch trips the third threshold voltage, and
   wherein the glitch profile circuitry utilizes the first count, the second count, and the third count to generate the multi-voltage profile of the glitch, wherein the multi-voltage profile includes indications of the time durations indicated by the first count, the second count, and the third count.

10. A method comprising:
    receiving a power supply voltage at an input;
    generating a first count with a first counter, indicative of a time duration that a glitch in a power supply voltage received at the input trips a first threshold voltage;
    generating a second count, with a second counter, indicative of a time duration that the glitch trips a second threshold voltage, the second threshold voltage being a different than first threshold voltage;
    generating, with glitch profile circuitry and utilizing the first count and the second count, a multi-voltage profile of the glitch, wherein the multi-voltage profile includes indications of the time durations indicated by the first count and the second count.

11. The method of claim 10 wherein the first threshold voltage is relative to the second threshold voltage such that the glitch in the power supply voltage trips the first threshold voltage prior to tripping the second threshold voltage, the method further includes resetting the first count of the first counter and the second count of the second counter responsive to an indication that the glitch no longer trips the first threshold voltage.

12. The method of claim 10 further comprising:
    utilizing the multi-voltage profile to determine whether a circuit receiving the power supply voltage is being attacked by glitches in the power supply voltage.

13. The method of claim 10 further comprising:
    generating a plurality of multi-voltage profiles for a plurality of glitches of the power supply voltage with the glitch profile circuitry, wherein the each of the plurality of multi-voltage profiles includes indications of the time durations indicated by counts of the first counter and counts of the second counter.

14. The method of claim 13 further comprising:
utilizing the plurality of multi-voltage profiles to determine whether a circuit receiving the power supply voltage is being attacked by glitches in the power supply voltage.

15. The method of claim 14, wherein the utilizing the multi-voltage profiles to determine whether the circuit is being attacked includes determining a timing relationship between occurrences of the plurality of glitches, wherein the determination of an attack is based on the timing relationship of the occurrences.

16. The method of claim 15 wherein the utilizing the multi-voltage profiles to determine whether a circuit is being attacked further includes determining whether a number of glitches of the plurality of glitches meeting at least one criteria occurs within a predetermined period of time.

17. The method of claim 15 wherein the determining the timing relationship includes utilizing a clock signal form a real time clock to provide a time of occurrence of each glitch.

18. The method of claim 10 further comprising:
generating a third count with a third counter, indicative of a time duration that the glitch trips a third threshold voltage, the third threshold voltage being different than the first threshold voltage and the second threshold voltage;
wherein the generating the multi-voltage profile includes generating, with the glitch profile circuitry and utilizing the first count, the second count, and the third count, the multi-voltage profile of the glitch, wherein the multi-voltage profile includes indications of the time durations indicated by the first count, the second count, and the third count.

19. The method of claim 10 further comprising:
receiving a second power supply voltage at a second input;
generating a third count with a third counter, indicative of a time duration that a second glitch in the second power supply voltage received at the second input trips a third threshold voltage;
generating a fourth count with a fourth counter, indicative of a time duration that the second glitch trips a fourth threshold voltage, the fourth threshold voltage being different than third threshold voltage; and
generating, with glitch profile circuitry and utilizing the third count and the fourth count, a second multi-voltage profile of the second glitch, wherein the second multi-voltage profile includes indications of the time durations indicated by the third count and the fourth count.

20. The circuit of claim 10 wherein the glitch is a drop in the power supply voltage at the input, wherein the first threshold voltage is a higher threshold voltage than the second threshold voltage.

* * * * *